United States Patent [19]
Tanigawa et al.

[11] Patent Number: 5,429,078
[45] Date of Patent: Jul. 4, 1995

[54] INTERNAL COMBUSTION ENGINE HAVING ROTARY ENGINE BODY

[76] Inventors: Hiroyasu Tanigawa; Kazunaga Tanigawa; Yukinaga Tanigawa, all of 428-35, Enami, Okayama-shi, Okayama-ken, Japan

[21] Appl. No.: 135,467

[22] Filed: Oct. 13, 1993

[30] Foreign Application Priority Data

Mar. 26, 1993 [JP] Japan .................. 5-105877

[51] Int. Cl.$^6$ .................. F02B 57/06; F02B 75/26
[52] U.S. Cl. .................. 123/45 A; 123/74 R; 123/553
[58] Field of Search .................. 123/45 R, 45 A, 51 B, 123/51 BA, 55.3, 74 R, 74 B

[56] References Cited

U.S. PATENT DOCUMENTS

| | | | |
|---|---|---|---|
| 648,914 | 5/1900 | Bertheau | 123/74 B |
| 3,776,203 | 12/1973 | Joyce . | |
| 3,994,632 | 11/1976 | Schreiber | 123/45 A |
| 4,988,290 | 1/1991 | Forster et al. | 432/103 |
| 5,133,305 | 7/1992 | Tanigawa et al. | 123/45 A |
| 5,230,307 | 7/1993 | Tanigawa et al. | 123/45 A |

FOREIGN PATENT DOCUMENTS

| | | | |
|---|---|---|---|
| 58-119930 | 7/1983 | Japan | 123/45 A |
| 58-200036 | 11/1983 | Japan | 123/45 A |
| 61-79821 | 4/1986 | Japan | 123/45 A |
| 2-31761 | 7/1990 | Japan | 123/45 A |
| 2-35841 | 8/1990 | Japan | 123/45 A |
| 58-135326 | 8/1993 | Japan | 123/45 A |

*Primary Examiner*—Michael Koczo
*Attorney, Agent, or Firm*—Michael D. Bednarek; Marks & Murase

[57] ABSTRACT

An internal combustion engine comprises a hollow rotary engine body, an axially opposite pair of main pistons capable of rotating with but slidably reciprocating relative to the engine body, a cam mechanism for causing the main pistons to make one full rotation with the engine body as the piston makes two reciprocations, and a pair of axially fixed auxiliary pistons coaxially inserted into the respective main pistons. A main combustion chamber is formed in the engine body between the main pistons, whereas a pair of auxiliary combustion chambers are formed in the respective auxiliary pistons. Explosive combustion takes place alternately in the main combustion chamber and each auxiliary combustion chamber.

17 Claims, 10 Drawing Sheets

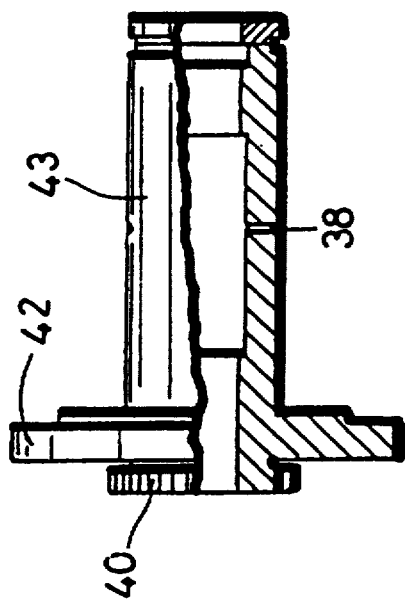
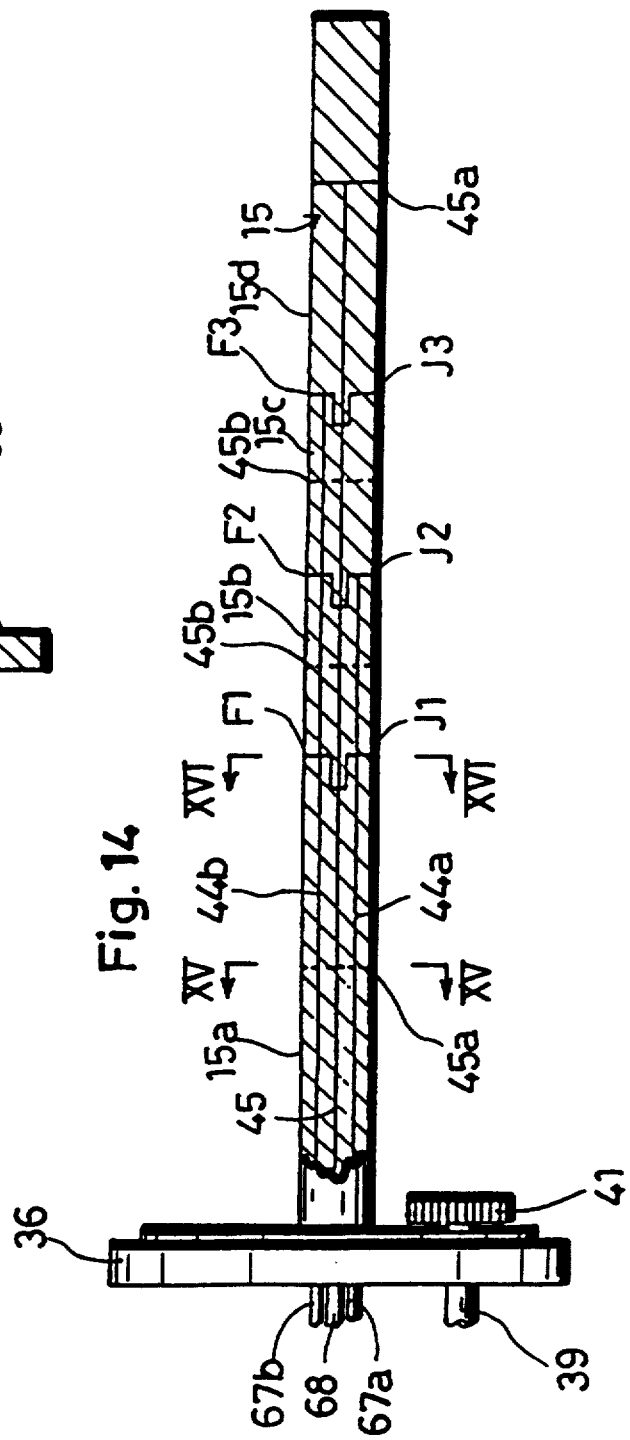
Fig. 13
Fig. 14

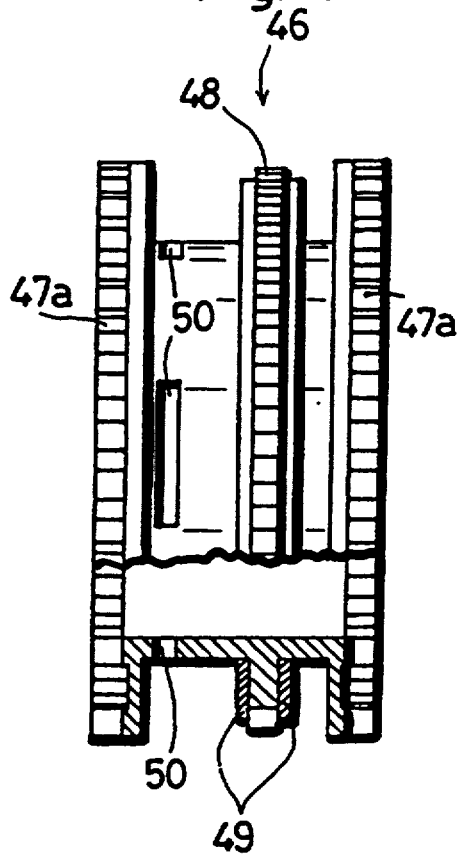
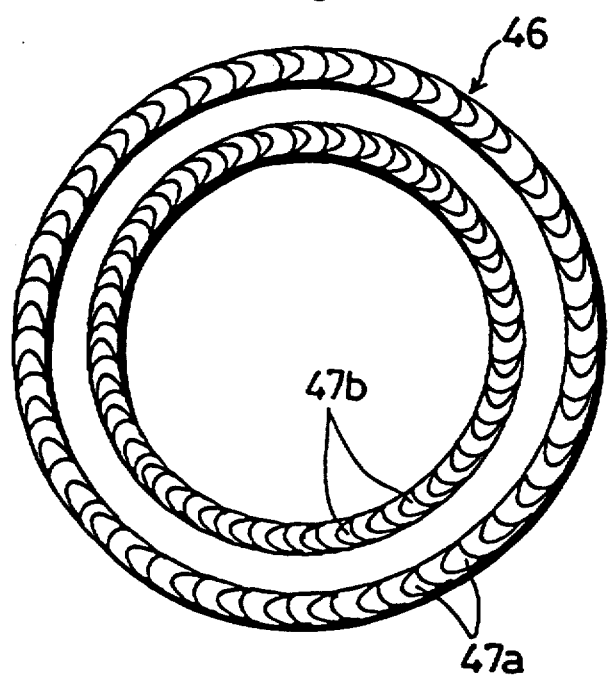
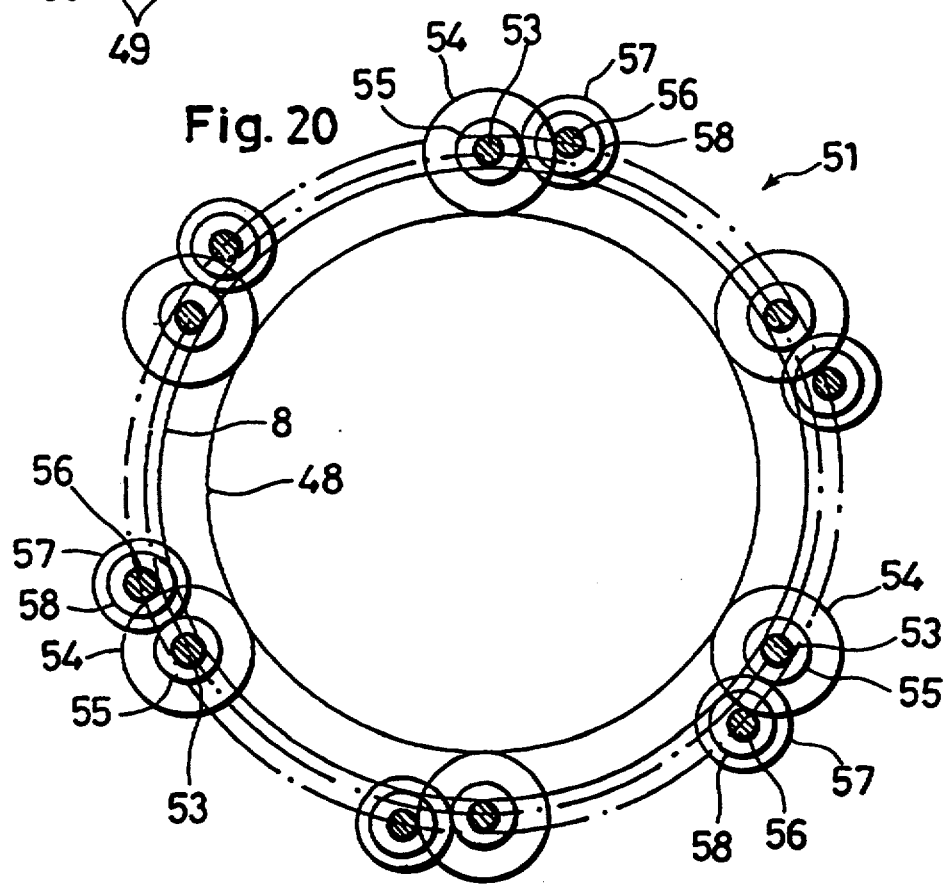

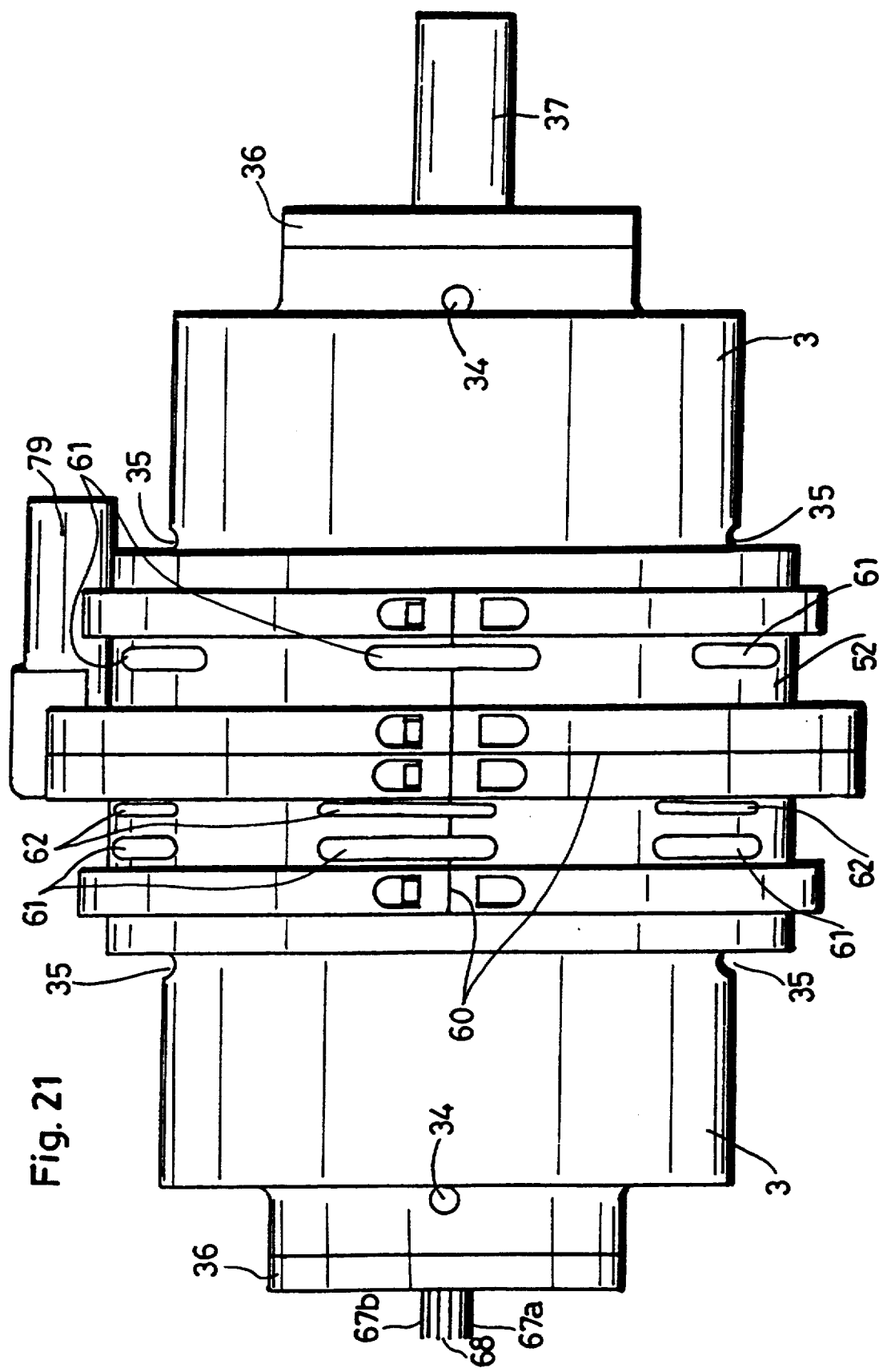

INTERNAL COMBUSTION ENGINE HAVING ROTARY ENGINE BODY

BACKGROUND OF THE INVENTION

1. Field of the Invention:

This invention relates generally to internal combustion engines. More particularly, the invention relates to an internal combustion engine of the type wherein an engine body itself is rotated to drive an output shaft.

2. Description of the Related Art:

As is well known, most of the conventional internal combustion engines equally incorporate a crank mechanism for converting piston reciprocation into rotation of the output shaft. Such a crank mechanism has been found to result in a non-negligible energy loss.

In view of the above problem, U.S. Pat. No. 5,133,305 of the same applicants discloses an internal combustion engine in which a pair of pistons are made to rotate with a cylindrical engine body as the pistons reciprocate in response to explosive combustion occurring in a combustion chamber between the pistons. The rotation of the engine body is directly transmitted to an output shaft without requiring a crank mechanism.

Specifically, the engine body disclosed in the above U.S. patent is rotatably received in a pair of cam cylinders, and has two pairs of longitudinal guide slots. The respective pistons have guide projections slidably guided by the longitudinal guide slots of the engine body, so that the pistons are rotatable with but slidably reciprocatable relative to the engine body. Each cam cylinder is internally formed with a curved cam groove, whereas each piston carries a pair of piston pins penetrating through the longitudinal guide slots to fit into the cam groove. The cam groove have such a profile that the piston makes one full rotation with the engine body as the piston makes two reciprocations.

Obviously, the above-described engine requires no crank mechanism, and therefore has an advantage of being higher in energy efficiency than the conventional reciprocating engines. Further, the rotation of the engine body causes air within the combustion chamber to rotate, so that the air can be forcibly and uniformly mixed with the fuel to provide an enhanced combustion efficiency.

However, in the above-described engine, explosive combustion takes place only at the upper deadpoint of piston reciprocation, and the pistons must move inertially from the lower deadpoint to the upper deadpoint. Thus, there is a limitation in increasing the engine output per unit cylinder volume.

SUMMARY OF THE INVENTION

It is, therefore, an object of the present invention to provide an internal combustion engine which has a rotary engine body, and wherein explosive combustion occurs both at the upper and lower deadpoints of piston reciprocation to increase the engine output per unit cylinder volume.

Another object of the present invention is to provide an internal combustion engine which has a rotary engine body, and which is capable of feeding highly compressed air both at the upper and lower deadpoints of piston reciprocation, thereby enabling effective scavenging of the engine and increasing the thermal efficiency of the engine.

Still another object of the present invention is to provide an internal combustion engine which has a rotary engine body, and which incorporates improved fuel injectors.

According to the present invention, there is provided an internal combustion engine comprising: a rotary engine body having a piston housing bore; an axially opposed pair of hollow main pistons disposed within the bore of the engine body to define a main combustion chamber between the pair of main pistons, the main pistons being rotatable with the engine body but slidably reciprocatable between upper and lower deadpoints relative to the engine body, the main pistons respectively carrying cam follower means extending transversely through the engine body; hollow cam carrier means rotatably receiving the engine body, the cam carrier means internally having a pair of curved cam grooves receiving the respective cam follower means of the main pistons for causing the main pistons to make one full rotation with the engine body as the main pistons make two reciprocations; a pair of axially fixed auxiliary pistons arranged on both sides of the main combustion chamber, the auxiliary pistons being inserted into the respective main pistons to define a pair of auxiliary combustion chambers within the respective main pistons; air supply means for supplying compressed air alternately into the main combustion chamber and into the auxiliary combustion chambers; and exhaust means for allowing exit of exhaust gas alternately from the main combustion chamber and from the auxiliary combustion chambers; wherein the piston housing bore of the engine body includes a diametrically smaller central bore portion and an axially opposite pair of diametrically larger end bore portions; and wherein each of the main pistons has a diametrically smaller portion for slidably fitting in the central bore portion of the engine body, and a diametrically larger portion for slidably fitting in a corresponding end bore portion of the engine body.

According to another aspect of the present invention, there is provided an internal combustion engine comprising: a rotary engine body having a piston housing bore; an axially opposed pair of hollow main pistons disposed within the bore of the engine body to define a main combustion chamber between the pair of main pistons, the main pistons being rotatable with the engine body but slidably reciprocatable between upper and lower deadpoints relative to the engine body, the main pistons respectively carrying cam follower means extending transversely through the engine body; hollow cam carrier means rotatably receiving the engine body, the cam carrier means internally having a pair of curved cam grooves receiving the respective cam follower means of the main pistons for causing the main pistons to make one full rotation with the engine body as the main pistons make two reciprocations; a pair of axially fixed auxiliary pistons arranged on both sides of the main combustion chamber, the auxiliary pistons being inserted into the respective main pistons to define a pair of auxiliary combustion chambers within the respective main pistons; air supply means for supplying compressed air alternately into the main combustion chamber and into the auxiliary combustion chambers; fuel supply means for supplying a fuel alternately into the main combustion chamber and into the auxiliary combustion chambers; and exhaust means for allowing exit of exhaust gas alternately from the main combustion chamber and from the auxiliary combustion chambers; wherein the main and auxiliary pistons are axially penetrated by a fixed central shaft which includes separable shaft portions connected at joints positionally corresponding to the main and auxiliary combustion chambers, the shaft portions being axially urged toward each other by an urging means; and wherein the fuel supply means comprises a fuel injector provided at each of the respective joints, the fuel injector having a fuel reservoir connected to a fuel supply source and a plurality of tapering discharge orifices extending radially from the fuel reservoir, the discharge orifices being normally closed by the urging means but openable against the urging means when the pressure in the fuel reservoir increases to a predetermined level.

Preferably, each of the joints may comprise a splined central projection and a splined central bore for slidably receiving the splined central projection, and the fuel reservoir being formed around the splined central projection. Further, the urging means may advantageously comprise a spring acting on an end face of the fixed central shaft. The urging means may alternatively or additionally comprise means for applying a hydraulic pressure on an end face of the fixed central shaft.

Other objects, features and advantages of the present invention will be fully understood from the following detailed description given with reference to the accompanying drawings.

BRIEF DESCRIPTION OF THE DRAWINGS

In the accompanying drawings:

FIG. 13 is a side view, partially in section, showing the other auxiliary piston;

FIG. 14 is a view, in longitudinal section, showing a fixed central axial shaft;

FIG. 18 is a side view, partially cut away, showing an exhaust turbine;

FIG. 19 is a front view of the turbine;

FIG. 20 is a schematic view showing a transmission gear mechanism associated with the exhaust turbine; and FIG. 21 is a side view showing the entire outer appearance of the engine.

DETAILED DESCRIPTION OF THE PREFERRED EMBODIMENT

Figure 1:
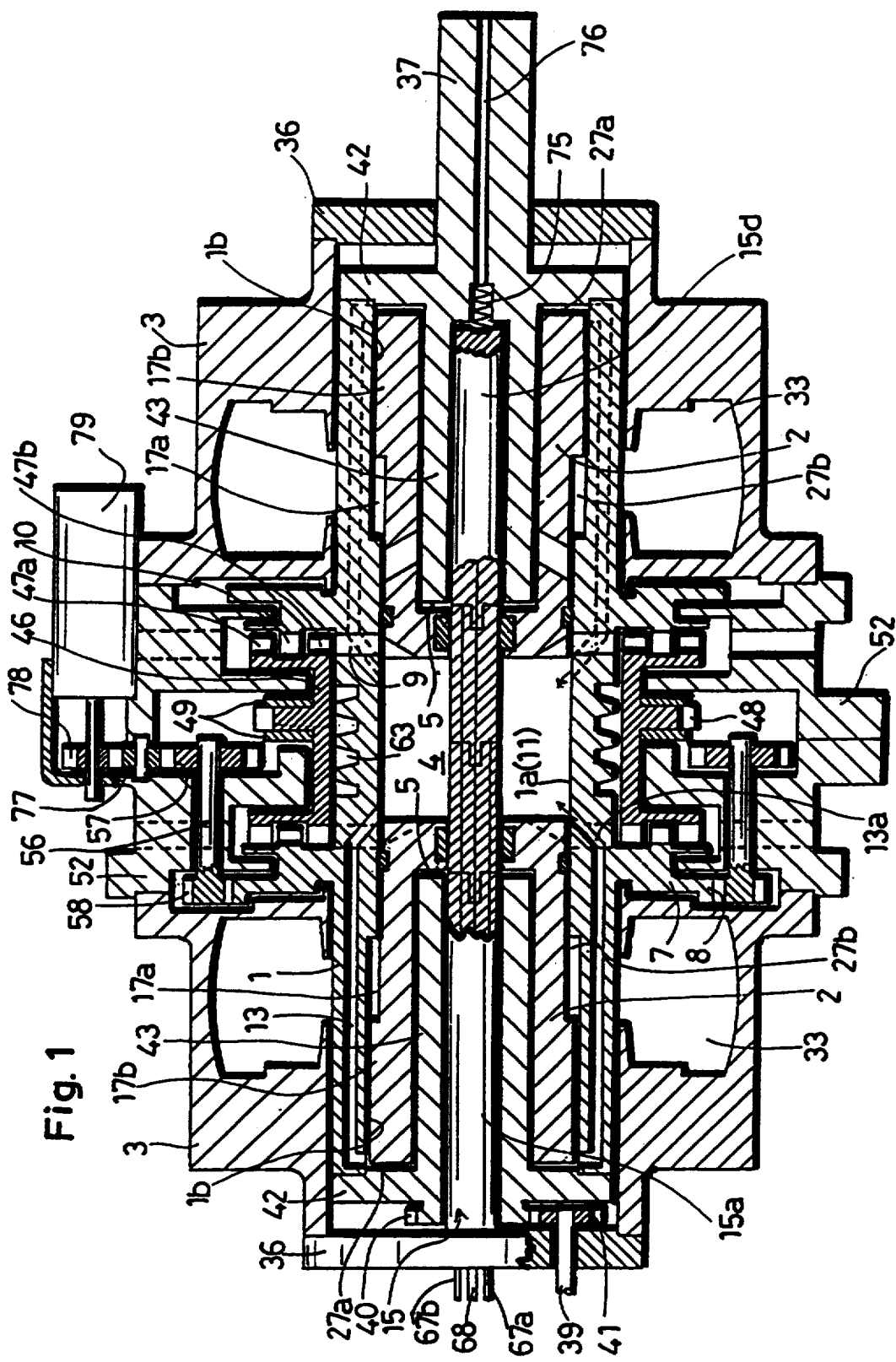
FIG. 1 is a view, in longitudinal section, showing an internal combustion engine according to the present invention with main pistons moved to the lower deadpoint.
Figure 2:
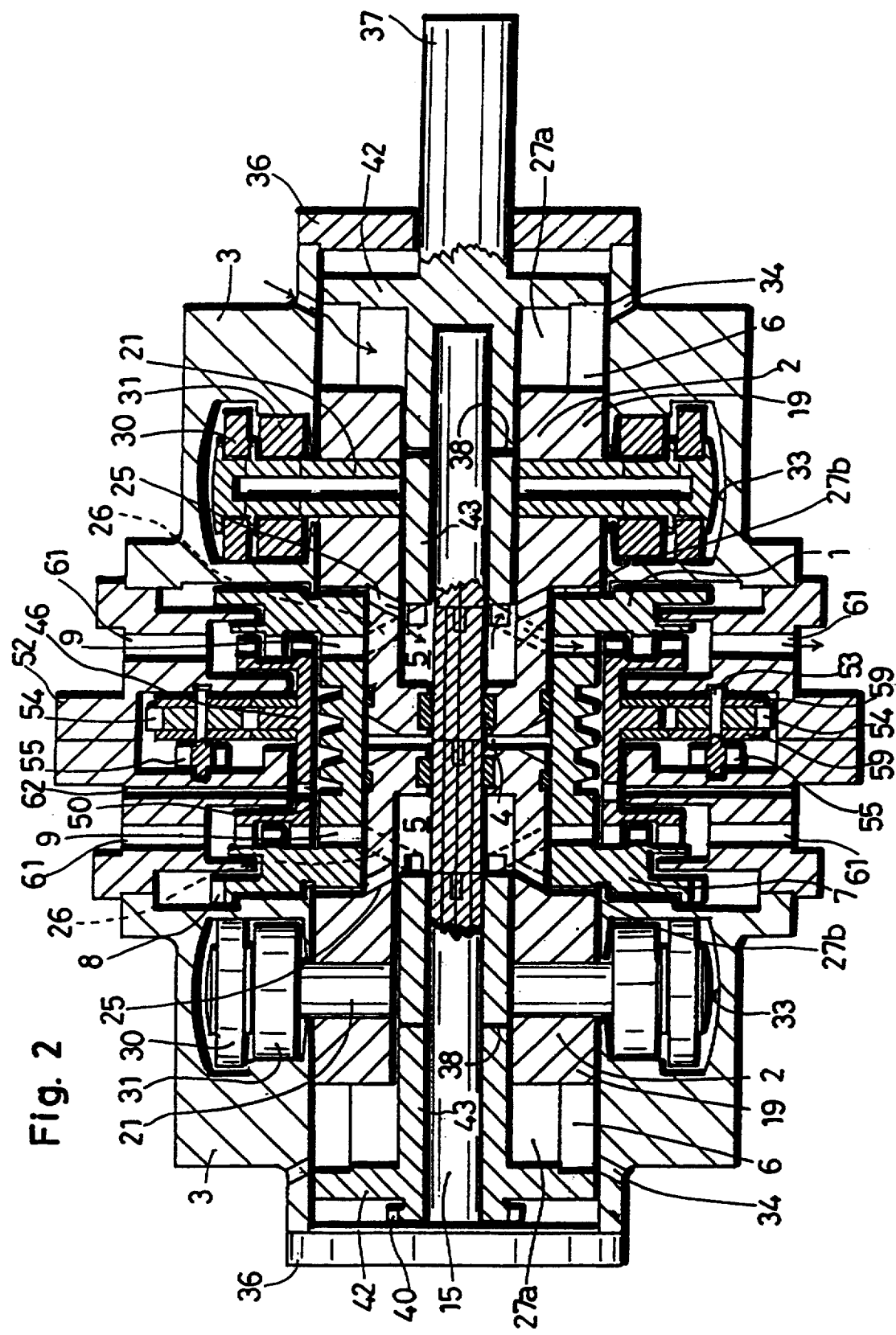
FIG. 2 is a view, also in longitudinal section, showing the same engine with the main pistons moved to the upper deadpoint.
Figure 3:
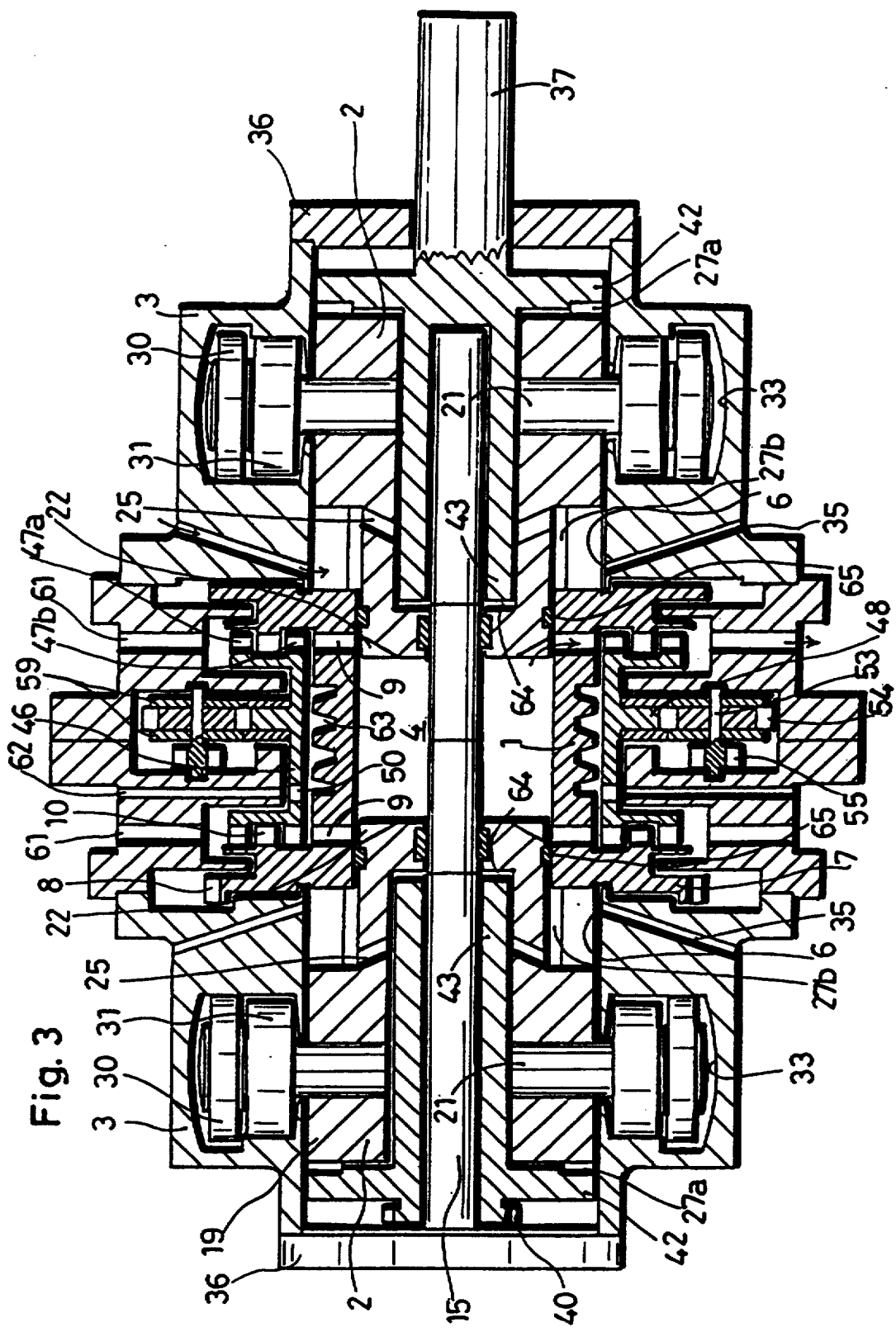
FIG. 3 is a sectional view similar to FIG. 2 but showing the same engine again with the main pistons moved to the lower deadpoint.

Referring first to FIGS. 1 through 3 of the accompanying drawings, there is illustrated an internal combustion engine according to the present invention. The illustrated engine mainly comprises a generally cylindrical engine body 1, an axially opposite pair of hollow main pistons 2 slidably guided by the engine body, a pair of fixed cam cylinders 3 fitted around the engine body in corresponding relation to the respective main pistons. The engine body 1 corresponds to an engine cylinder of a conventional internal combustion engine, but differs therefrom in that the engine body itself is rotatable.

A central combustion chamber 4 (see FIGS. 1 and 3) is formed within the engine body 1 between the respective main pistons 2, whereas a pair of auxiliary combustion chambers 5 (see FIG. 2) are formed within the respective main pistons 2. Thus, three combustion chambers are provided in the single engine cylinder according to the present invention.

Figure 4:
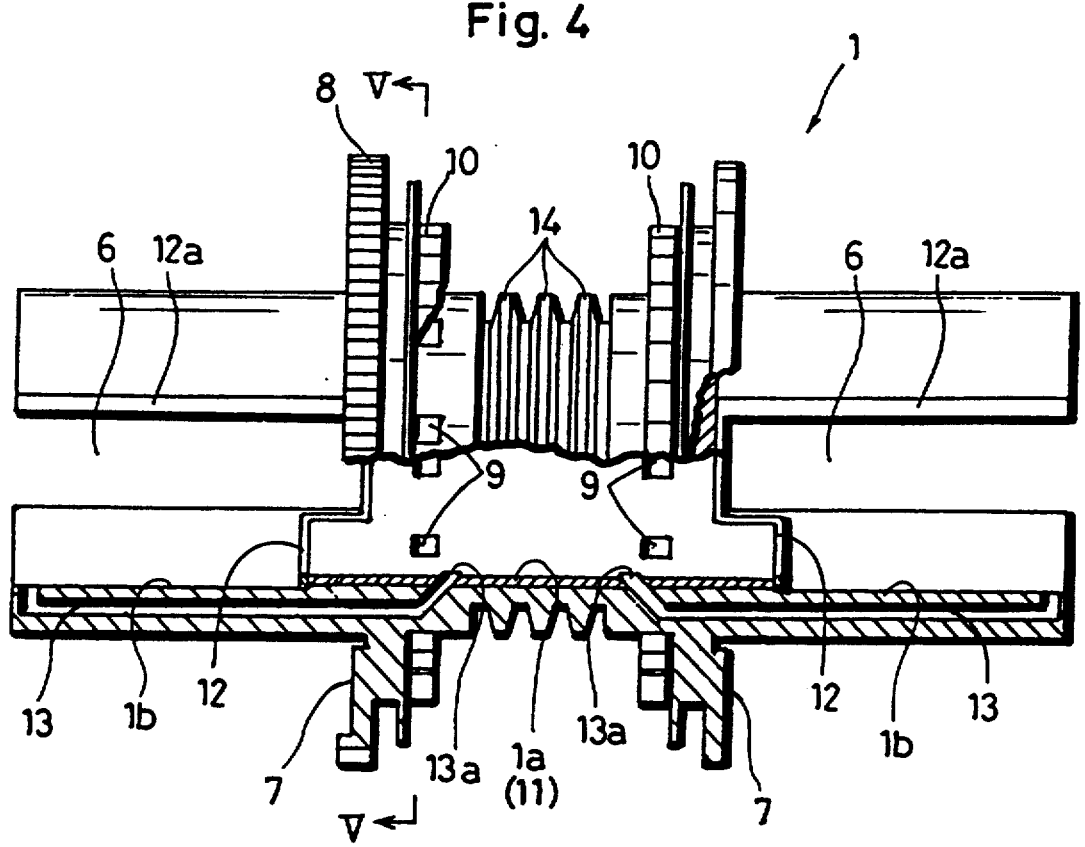
FIG. 4 is a plan view, partly cut away, showing an engine body.

As shown in FIGS. 2 through 4, each end of the engine body 1 is formed with a diametrically opposite pair of axial guide slots 6 for slidably guiding the corresponding piston 2. A non-slotted central portion of the engine body is externally formed with a pair of axially spaced annular thrust flanges 7. One of the thrust flanges 7 is integrally formed with an annular driven gear 8.

The engine body 1 is also formed with two annular series of main exhaust ports 9 between but close to the respective thrust flanges 7. These exhaust ports 9 communicate with the central combustion chamber 4 when the main pistons 2 approach the lower deadpoint of reciprocation (FIGS. 1 and 3).

Figure 5:
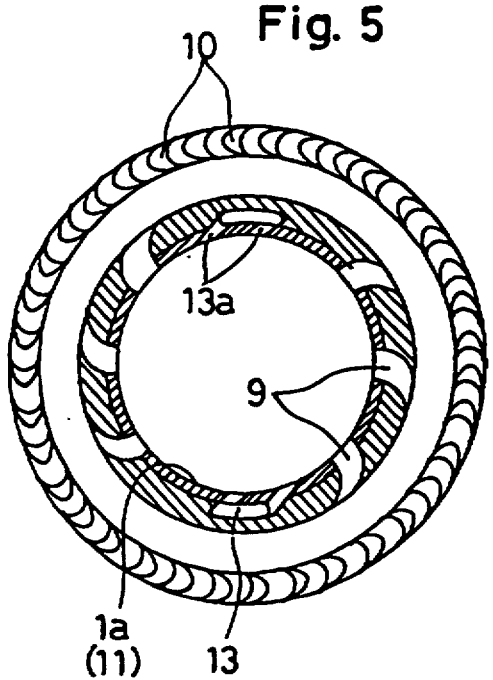
FIG. 5 is a sectional view of the engine body taken on lines V—V in FIG. 4.
Figure 6:
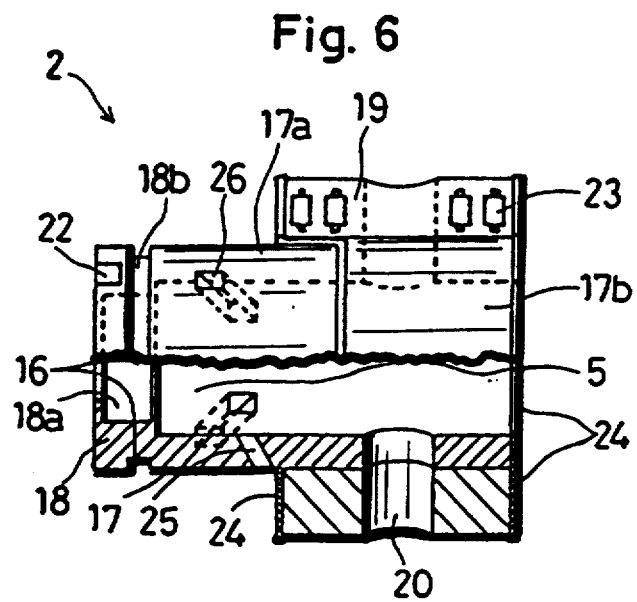
FIG. 6 is a side view, partly cut away, showing one of the main pistons.
Figure 7:
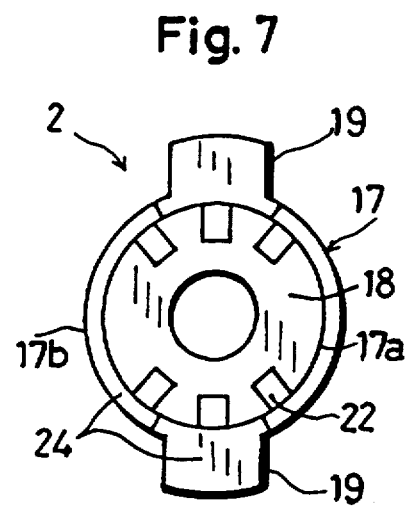
FIG. 7 is a rear view of the same main piston as seen from ahead.
Figure 8:
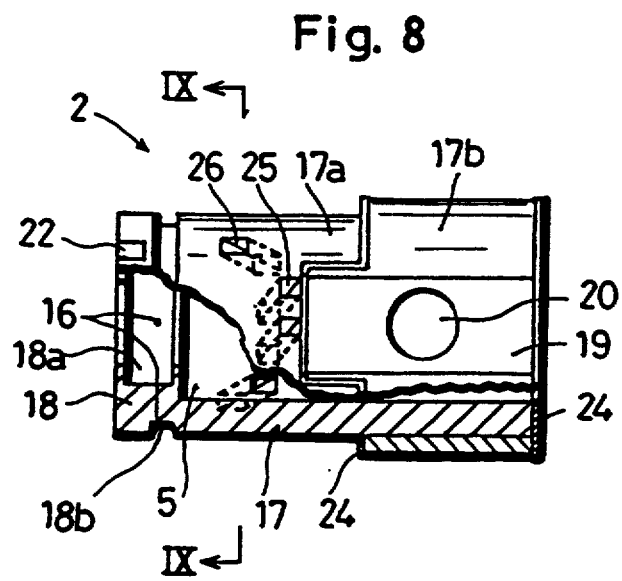
FIG. 8 is a plan view, partially cut away, showing the same main piston.
Figure 9:
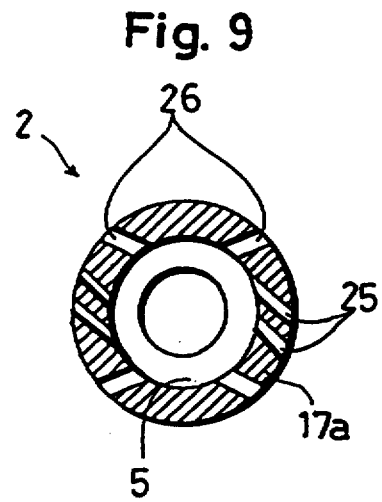
FIG. 9 is a sectional view taken along lines IX—IX in FIG. 8.

As best shown in FIG. 5, each of the main exhaust port 9 penetrates the wall thickness of the engine body 1 along an involute curve. Thus, the exhaust gas having passed through the exhaust port produces a rotational force to assist rotation of the engine body 1.

As shown in FIGS. 4 and 5, each of the thrust flanges 7 is integrally formed with an annular series of movable blades 10 in axial alignment with the corresponding series of main exhaust ports 9. Obviously, the series of movable blades 10 also assists rotation of the engine body 1.

According to the illustrated embodiment, the cylinder bore of the engine body 1 includes a diametrically smaller central portion 1a provided by a heat-resistant ceramic lining 11, and an axially opposite pair of diametrically larger end portions 1b (see FIGS. 1, 4 and 5). The ceramic lining 11 for the central bore portion 1a, which surrounds the central combustion chamber 4, reduces the cooling loss of the heat energy.

As shown in FIG. 4, an annular seal member 12 is provided at the boundary between the central bore portion 1a of the engine body 1 and each of the end bore portions 1b. The seal member 12 also has axial portions 12a extending along the edges of the corresponding guide slot 6.

The cylindrical wall of the engine body 1 is formed, in its wall thickness, with main air supply passages 13 extending axially from the respective ends to the central portion of the engine body, as shown in FIGS. 1, 4 and 5. The main air supply passages 13 communicate with the main combustion chamber 4 through inlet ports 13a (see FIG. 5) for scavenging the main combustion chamber 4 when the respective main pistons 2 approach the lower deadpoint (see FIG. 1), as more specifically described hereinafter.

In the illustrated embodiment, each of the inlet ports 13a is inclined toward the center of the engine body 1 (see FIG. 4) and in the rotational direction (in FIG. 5) of the engine body 1 for effectively scavenging the main combustion chamber 4 and for improving combustion within the main combustion chamber 4. Indicated by reference numeral 14 are cooling fins formed externally on the central portion of the engine body 1.

The respective main pistons 2 are slidably and rotatably fitted on a fixed central axial shaft 15. The two main pistons 2 are symmetrical to each other and therefore has substantially the same configuration. The pistons 2 may be integrally made of a heat-resistant ceramic material.

As shown in FIGS. 6 through 9, each of the main pistons 2 has a tubular member 17 which includes a diametrically smaller portion 17a and a diametrically larger portion 17b. The diametrically smaller portion 17a is held in sliding contact with the central bore portion 1a of the engine body 1 (see FIG. 1), whereas the diametrically larger portion 17b is held in sliding contact with the corresponding end bore portion 1b of the engine body 1 (see also FIG. 1). The corresponding auxiliary combustion chamber 5 is formed in the diametrically smaller portion 17a of the main piston 2.

The diametrically smaller portion 17a of the main piston 2 has an integral piston head 18 which is radially penetrated by a plurality of lubricant passage pores 16 (see FIGS. 6 and 8) for centrifugally supplying a lubricating oil. The piston head 18 is formed with an internal annular recess 18a for receiving an inner piston ring 64 (see FIG. 3) as well as with an external annular recess 18b for receiving an outer piston ring 65 (see also FIG. 3). The inner piston ring 64 is held in slidable and rotatable contact with the central axial shaft 15, whereas the outer piston ring 65 comes in slidable contact with the central bore portion 1a of the engine body 1.

The piston head 18 is also formed externally with exhaust guide grooves 22 in corresponding relation to the main exhaust ports 9 of the engine body 1. The exhaust guide grooves 22 serve to establish communication between the main combustion chamber 4 and the main exhaust ports 9 when the main piston 2 moves to the lower deadpoint (see FIG. 3).

Further, the diametrically smaller portion 17a of the main piston 2 is provided with auxiliary air supply ports 25 and auxiliary exhaust ports 26. The auxiliary air supply ports 25 and auxiliary exhaust ports 26 extend obliquely (FIG. 9) and communicate with the corresponding auxiliary combustion chamber 5 when the main piston 2 approaches the upper deadpoint (FIG. 2). The auxiliary exhaust ports 26 also communicate with the corresponding main exhaust ports 9 of the engine body 1 when the main piston 2 moves to the upper deadpoint (see also FIG. 2). The inclination of the auxiliary air supply ports 25 is such as to enable effective scavenging of the auxiliary combustion chamber 5 and ideal combustion in the auxiliary combustion chamber.

On the other hand, the diametrically larger portion 17b of the main piston 2 is integrally formed with a diametrically opposite pair of box-like guide projections 19 which are fittable into the corresponding pair of guide slots 6 of the engine body 1 (see FIGS. 2-4). Thus, the main piston is axially slidable relative to but rotatable with the engine body. Each of the respective guide projections 19 is formed with a transverse tubular bore 20 for receiving a piston pin 21 (FIGS. 2 and 3).

Preferably, each of the respective guide projections 19 is laterally provided with a suitable number of rollers 23 (see FIG. 6) for reducing friction against the corresponding guide slot 6. Further, the front and rear edges of the diametrically larger portion 17b of the main piston 2 as well as the front and rear end faces of the respective box-like guide projections 19 are provided with seal members 24 for hermetically sealing between the engine body 1 and the main piston 2. Indeed, it is due to the provision of the seal members 24 that enables the use of the rollers 23 for frictional reduction.

As clearly shown in FIGS. 2 and 3, each guide slot 6 of the engine body 1 is divided by the corresponding guide projection 19 of the main piston 2 into a main air supply chamber 27a (FIG. 2) and an auxiliary air supply chamber 27b (FIG. 3). The main air supply chamber 27a communicates with the main combustion chamber 4 through the corresponding main air supply passage 13 of the engine body 1 when the main piston makes its stroke toward the lower deadpoint (FIG. 1). The auxiliary air supply chamber 27b communicates with the corresponding auxiliary combustion chamber 5 through the corresponding auxiliary air supply ports 25 of the main piston 2 when the main piston makes its stroke toward the upper deadpoint (FIG. 2).

According to the illustrated embodiment, the main air supply chamber 27a includes not only a portion of the guide slot 6 behind the main piston 2 but also an annular space behind the main piston. Similarly, the auxiliary air supply chamber 27b includes not only a portion of the guide slot 6 ahead of the main piston 2 but also an annular space ahead of the diametrically larger portion 17b of the main piston 2, as clearly shown in FIG. 1.

Figure 10:
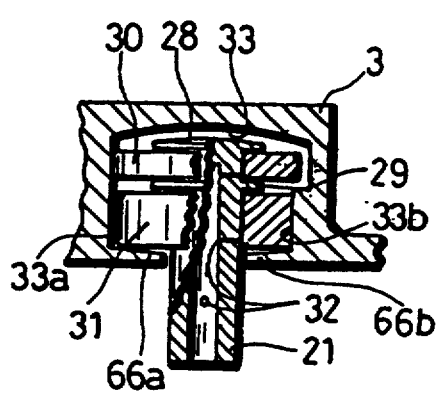
FIG. 10 is a view, partly in section, showing a piston pin.

Each piston pin 21 functions as a cam follower which is cooperative with the corresponding cam cylinder 3, as described hereinafter. As best shown in FIG. 10, the piston pin is tubular, and has a radially outer end formed with a first thrust bearing flange 28 which resembles an umbrella. The piston pin further has a second thrust bearing flange 29 slightly spaced from the first thrust bearing flange.

A first roller 30 is rotatably fitted on the piston pin 21 between the first and second thrust bearing flanges 28, 29. A second roller 31 is also fitted rotatably on the piston pin inwardly of the second thrust bearing flange 29. The first roller 30 is slightly larger in diameter than the second roller 31 for the purpose to be described later. Indicated at 32 are lubrication ports suitably formed in the wall thickness of the piston pin.

Each cam cylinder 3 is fitted around the corresponding slotted end portion of the engine body 1, as shown in FIGS. 1-3. The cam cylinder is internally formed with a cam groove 33 for receiving the rollers 30, 31 of the respective piston pins 21. The cam groove is curved substantially along a sinous curve, so that the corresponding main piston 2 together with the engine body 1 makes one full rotation as the main piston makes two reciprocations. The cam cylinder may be made to have two axially separable portions 3a, 3b (see FIG. 11) for facilitating assembly.

Figure 11:
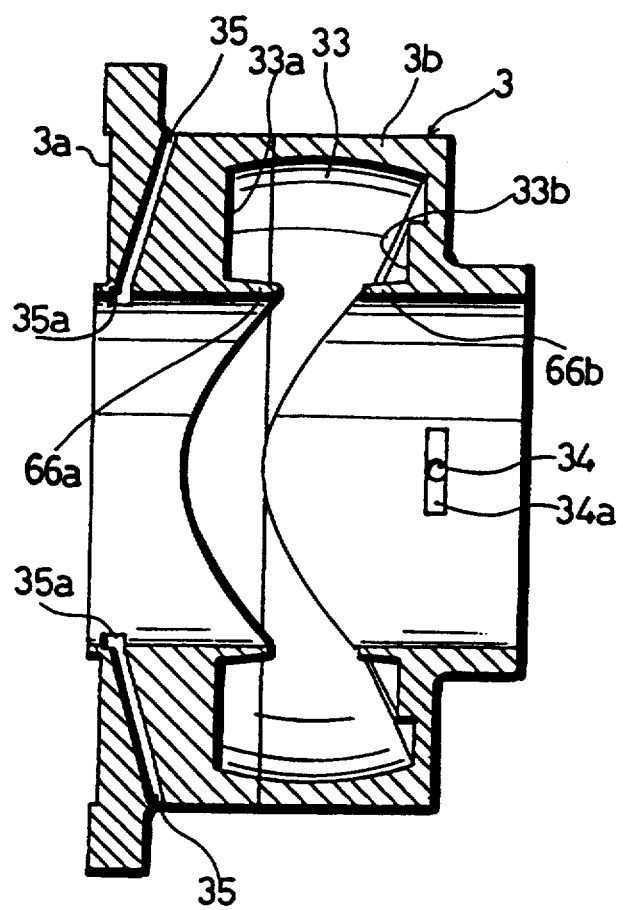
FIG. 11 is a sectional view showing a cam cylinder.

As better shown in FIGS. 10 and 11, the cam groove 33 has an inner track (inner lateral surface) 33a and an outer track (outer lateral surface) 33b. The inner track 33a comes into contact only with the first roller 30 of each piston pin 21, whereas the outer track 33b is slightly stepped to come into contact with the second roller 31 only. As described before, the first roller 30 is diametrically larger than the second roller 31. It is this diametrical difference that enables such a differential contact of the respective rollers relative to the respective cam tracks.

It is now supposed that the piston pin 21 carries only a single roller. In such an arrangement, the roller must pressingly contact alternately with the respective tracks 33a, 33b of the cam groove 33, and alternation occurs upon every change in reciprocating direction of the main piston 2. However, the inner and outer cam tracks 33a, 33b cause the roller to rotate in the opposite directions as long as the main piston 2 keeps on rotating in one direction. Thus, a great friction occurs between the roller and the respective cam tracks upon every change in reciprocating direction of the piston, thereby impairing smooth operation of the engine and resulting in a great energy loss.

According to the illustrated embodiment, the first roller 30 contacts only the inner cam track 33a and keeps on rolling only in one direction, whereas the second roller 31 contacts only the outer cam track 33b and keeps on rolling only in the opposite direction. Thus, the main piston 2 is capable of smoothly rotating and reciprocating with a greatly reduced frictional energy loss. Further, the use of two rollers 30, 31 for each piston pin 21 is preferred to reduce the bearing burden on each roller.

Preferably, the cam groove 33 is partially closed by a first projection 66a and a second projection 66b. The first and second projections 66a, 66b are spaced from each other by a distance slightly larger than the outer diameter of the corresponding piston pin 21. Since the projections 66a, 66b serve to increase the effective guiding length of the cam cylinder 3 despite the presence of the relatively wide cam groove 33, the axial length of the cam cylinder 3 can be correspondingly reduced.

The cam cylinder 3 is formed with a diametrically opposite pair of main air suction ports 34 positioned axially outwardly of the cam groove 33 (see FIGS. 2 and 11), and a diametrically opposite pair of auxiliary air suction ports 35 positioned axially inwardly of the cam groove 33 (see FIGS. 3 and 11). The main air suction ports 34 communicate with the respective main air supply chambers 27a when the respective guide slots 6 of the engine body 1 overlap the main air suction ports; that is, when the corresponding main piston 2 approaches the upper deadpoint of reciprocation, as shown in FIG. 2. On the other hand, the auxiliary air suction ports 35 communicate with the respective auxiliary air supply chambers 27b when the corresponding main piston 2 approaches the lower deadpoint of reciprocation, as shown in FIG. 3.

As also shown in FIG. 11, the respective main air suction ports 34 have radially inner ends or valve openings 34a which are elongated circumferentially of the cam cylinder 3 to suitably cooperate with the rotating engine body 1 for opening and closing the main air suction ports 34. Similarly, the respective auxiliary air suction ports 35 have radially inner ends or valve openings 35a which are also elongated circumferentially of the cam cylinder for opening and closing the auxiliary air suction ports 35. The valve openings 34a for the main air suction ports 34 are angularly spaced 90° from the valve openings 35a for the auxiliary air suction ports 35, so that the two kinds of air suction ports 34, 35 are opened and closed alternately as the engine body 1 rotates. The circumferential length of the respective valve openings 34a, 35a may be determined depending on various engine requirements.

The pair of cam cylinders 3 have their respective axially outer ends closed by a pair of closure plates 36. One of the closure plates 36 (right one in FIGS. 1–3) is rotatably penetrated by a main output shaft 37 to take out the engine drive power, whereas the other closure plate (left one in FIGS. 1–3) is rotatably penetrated by an auxiliary output shaft 39 which carries a driven gear 41 (FIG. 1) in mesh with a drive gear 40. The auxiliary output shaft 39 is used for driving unillustrated auxiliary parts such as a lubricant supply pump.

Figure 12:
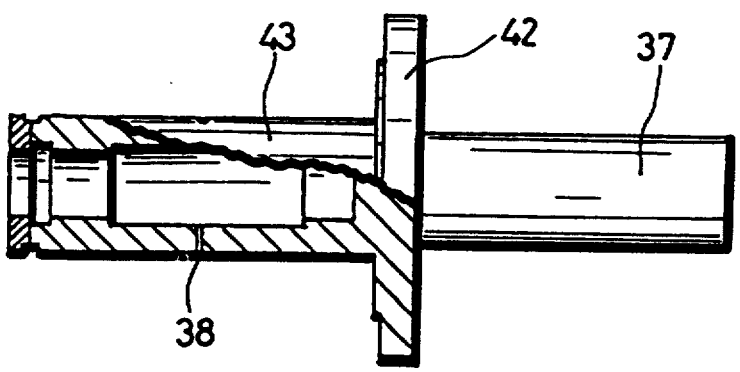
FIG. 12 is a side view, partially in section, showing one of two auxiliary pistons.

The main output shaft 37 is integral with an end lid 42 attached to one end (right end in FIGS. 1–3) of the engine body 1 for rotation therewith, as shown in FIG. 12. Similarly, the drive gear 40 is integral with another end lid 42 attached to the other end (left end in FIGS. 1–3) of the engine body for rotation therewith, as shown in FIG. 13. The respective end lids 42 are substantially identical in configuration.

As illustrated in FIGS. 12 and 13, each of the end lids 42 is formed integrally with a cylindrical auxiliary piston 43 which is inserted into the corresponding main piston 2, so that the corresponding auxiliary combustion chamber 5 is formed within the main piston. The cylindrical wall of the auxiliary piston 43 is provided with a plurality of lubrication pores 38.

As shown in FIGS. 1–3 and 14, the central axial shaft 15 rotatably supports the respective auxiliary pistons 43 and is made integral with the left-hand end closure plate 36. In the illustrated embodiment, the shaft 15 has four separate shaft portions (first to fourth shaft portions) 15a–15d connected in series at first to third joints J1–J3 (see FIG. 14), as more specifically described later.

Figure 15:
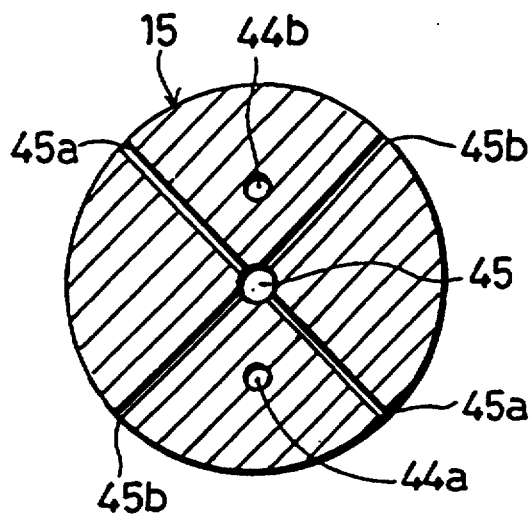
FIG. 15 is a sectional view taken along lines XV—XV in FIG. 14.

As shown in FIGS. 14–17, a central lubricant supply passage 45 extends axially in the central axial shaft 15 and is connected to a lubricant supply pipe 68. The central lubricant supply passage 45 branches radially into wider lubrication pores 45a and narrower lubrication pores 45b (FIGS. 14 and 15).

The respective joints J1–J3 between the four separate shaft portions 15a–15d of the central axial shaft 15 are similar in configuration. At the first joint J1 for example, the second shaft portion 15b is formed with a splined central projection 69, whereas the first shaft portion 15a is formed with a complementary splined central bore 70 for receiving the splined projection 69, as shown in FIGS. 1. Due to the spline connection, the two adjacent shaft portions are slidably movable but non-rotatable relative to each other. An O-ring 71 is provided to seal between the central projection 69 and the central bore 70 with respect to the central lubricant supply passage 45.

As shown in FIG. 14, first to third fuel injectors F1–F3 are provided at the first to third joints J1–J3. All of the fuel injectors have a similar configuration.

Figure 16:
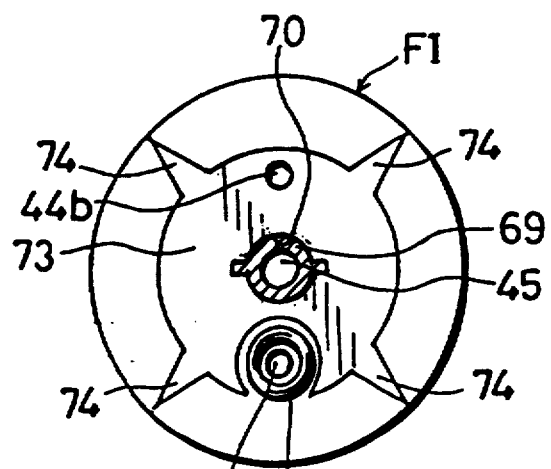
FIG. 16 is a sectional view taken along lines XVI—XVI in FIG. 14.
Figure 17:
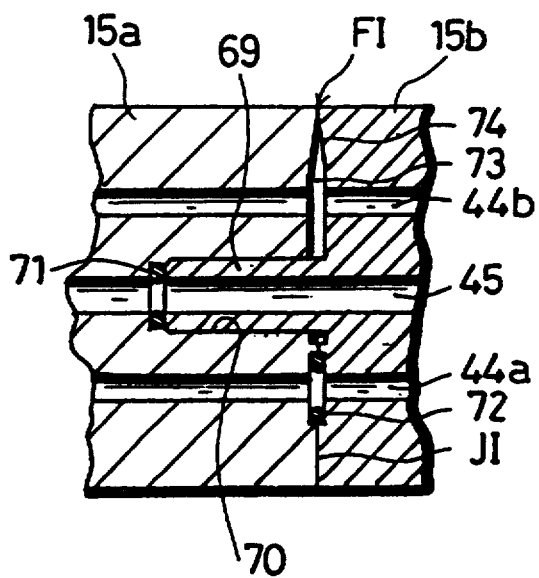
FIG. 17 is an enlarged fragmentary sectional view showing details of a fuel injector.

For example, the first fuel injector F1 comprises a fuel reservoir 73 formed around the splined central projection 69 at the first joint J1, and a plurality of tapering discharge orifices 74 extending radially from the fuel reservoir, as shown in FIGS. 16 and 17. Though not shown, each of the second and third fuel injectors F2, F3 also comprises a fuel reservoir and a plurality of tapering discharge orifices. It should be noted that the first and third fuel injectors F1, F3 are positioned to inject fuel into the respective auxiliary combustion chambers 5 (see FIGS. 1 and 2), whereas the second fuel injector F2 is located to inject fuel into the main combustion chamber 4 (see also FIGS. 1 and 2).

A main fuel passage 44a and an auxiliary fuel passage 44b extend axially in the central axial shaft 15, as shown in FIGS. 14–17. The main fuel passage 44a is connected to a main fuel supply pipe 67a (FIG. 14), whereas the auxiliary fuel passage 44b is connected to an auxiliary fuel supply pipe 67b.

As shown in FIGS. 16 and 17, the main fuel passage 44a is sealed from the fuel reservoir 73 of the first fuel injector F1 by an O-ring 72. However, the main fuel passage opens into and terminates at the fuel reservoir (not specifically shown) of the second fuel injector F2 (see FIG. 14).

On the other hand, the auxiliary fuel passage 44b opens into the fuel reservoir 73 of the first fuel injector F1, as also shown in FIGS. 16 and 17. The auxiliary fuel passage 44b also extends through the fuel reservoir of the second fuel injector F2 (FIG. 14) as sealed therefrom by an unillustrated O-ring in the same manner as shown in FIG. 17. Further, the auxiliary fuel passage 44b opens into and terminates at the fuel reservoir (not specifically shown) of the third fuel injector F3 (see FIG. 14).

As illustrated in FIG. 1, the central axial shaft 15 is always urged axially by a spring 75 interposed between the main output shaft 37 and the fourth shaft portion 15d. Thus, the respective discharge orifices 74 (see FIG. 17) of each fuel injector F1–F3 is normally closed by the urging force of the spring 75 but openable when the pressure in the corresponding fuel reservoir 73, which is connected either to the main fuel passage 44a or the auxiliary fuel passage 44b, rises to a level which overcomes the urging force of the spring 75. In actual operation, such a pressure rises occurs alternately with respect to the main fuel passage 44a and the auxiliary fuel passage 44b in timed relation to the piston reciprocation.

Additionally or alternatively, a hydraulic pressure may be also applied axially to the central axial shaft 15 through a hydraulic passage 76 extending axially in the main output shaft 37, as also shown in FIG. 1. The application of such a hydraulic pressure is advantageous in that the fuel injection at the respective fuel injectors F1–F3 can be readily adjusted by varying the applied hydraulic pressure.

As shown in FIGS. 1–3, 18 and 19, an exhaust turbine 46 is rotatably arranged around the central portion of the engine body 1. The turbine has two diametrically different annular series of turbine blades 47a, 47b arranged to surround each annular series of exhaust ports 9 of the engine body (see FIGS. 1–3), so that the turbine is rotated by the whirling exhaust gas which has passed through the exhaust ports 9. The diametrically larger series of turbine blades 47a is arranged radially outwardly of the corresponding movable blades 10 of the engine body 1, whereas the diametrically smaller series of turbine blades 47b is arranged radially inwardly of the movable blades 10.

According to the illustrated embodiment, the blades of the exhaust turbine 46 are provided in two stages or annular series 47a, 47b relative to each annular series of main exhaust ports 9. However, the number of blade stages or series may be optionally determined to optimize the thermal efficiency depending on the various requirements of the engine.

The exhaust turbine 46 further has an annular drive gear 48 which is directly flanked by a pair of bearing annuli 49. Each bearing annulus 49 has an outer diameter substantially corresponding to the pitch diameter of the drive gear 48. Indicated at 50 are cooling air inlet openings for allowing entry of cooling air into an annular cooling chamber 63 between the engine body 1 and the turbine 46.

Rotation of the exhaust turbine 46 is retrospectively transmitted to the engine body 1 by way of a transmission gear mechanism 51 (FIG. 20). The exhaust turbine 46 and the transmission gear mechanism 51 are housed in a gear casing 52 (FIGS. 1–3 and 21).

As shown in FIGS. 1–3 and 20, the transmission gear mechanism 51 includes a first group of shafts 53 (six in the illustrated embodiment) rotatably supported in the gear casing 52. Each of the first group shafts 53 carries a first transmission gear 54 in mesh with the drive gear 48 of the turbine 46, and a second transmission gear 55. Further, the transmission gear mechanism 51 also includes a second group of shafts 56 (also six in the illustrated embodiment) rotatably supported in the gear casing 52. Each of the second group shafts 56 carries a third transmission gear 57 in mesh with the second transmission gear 55 (FIG. 20), and a fourth transmission gear 58 in mesh with the annular driven gear 8 of the engine body 1.

According to the illustrated embodiment, the exhaust turbine 46 is rotated in the opposite direction relative to the engine body 1 by the exhaust gas. Such rotation of the turbine is in turn utilized to drive the engine body through the transmission gear mechanism 51. Thus, the heat and flow energy of the exhaust gas is effectively recovered to increase the output of the engine. Further, the turbine can also function as a flywheel for the engine, and no separate flywheel is necessary, as opposed to the conventional reciprocating engine.

As shown in FIGS. 2 and 3, each of the first group shafts 53 further carries a pair of bearing rings 59 on both sides of the corresponding first transmission gear 54. The respective bearing rings 59 have an outer diameter substantially corresponding to the pitch diameter of the first transmission gear 54, and are held in rolling contact with the respective bearing annuli 49 of the turbine 46.

The combination of the bearing rings 59 and the bearing annuli 49 prevents the exhaust turbine 46 from displacing axially and radially. Thus, the turbine can be held floating around the engine body 1 without requiring to provide a bearing between the turbine and the engine body.

As shown in FIG. 1, one of the third transmission gears 57 is held in mesh with an intermediate gear 77 which is rotatably supported in the gear casing 52 and held in mesh with a starter gear 78 driven by a starter motor 79. In this way, the transmission gear mechanism 51 for the exhaust turbine 56 may be also utilized as a reduction mechanism for an engine starter system.

Obviously, for purposes of engine start, the starter gear 78 of the starter motor 79 may be made to drive any one of the first to fourth transmission gears 54, 55, 57, 58 directly or indirectly via an intermediate gear. The selection of the transmission gear to which the starter motor 79 is coupled may be made depending on the available torque and rotational speed of the starter motor as well as the size and weight of the engine itself.

As shown in FIGS. 1–3 and 21, the gear casing 52 is interposed between and coupled to the pair of cam cylinders 3. Preferably, the casing 52 comprises four separable parts joined together into a cylindrical form along axial and circumferential joining lines 60, thereby facilitating assembly of the interior components. Further, the casing 52 is provided with two annular series of discharge ports 61 in communication with the respective series of main exhaust ports 9 of the engine body 1 to enable discharge of the exhaust gas after driving the turbine 46. Represented by reference numeral 62 is an annular series of cooling air intake ports for introducing external air into the cooling chamber 63 between the engine body 1 and the turbine 46 through the cooling air inlet openings 50 (see FIGS. 2, 3 and 18) of the turbine.

The engine according to the embodiment described above operates in the following manner.

ENGINE START

The engine operation is started by actuating the starter motor 79 (FIG. 1). The engine body 1 together with each main piston 2 makes one full rotation as the main piston makes two reciprocations, as already described. FIG. 2 shows the upper deadpoint of the piston reciprocation, whereas FIGS. 1 and 3 represents the lower deadpoint.

UPPER DEADPOINT

At or near the upper deadpoint of FIG. 2, an amount of air previously compressed in the main combustion chamber 4 is mixed with an amount of fuel supplied by the second fuel injector F2 (see FIG. 14), and the air-fuel mixture is spontaneously ignited at a high temperature which results from high degree of compression. Further, a new supply of air is introduced into the respective main air suction ports 34 because the end valve openings 34a (FIG. 11) of the main air suction ports 34 overlap the respective guide slots 6 of the engine body 1 at or near the upper deadpoint.

On the other hand, an amount of air previously compressed in the auxiliary air supply chambers 27b is introduced into the respective auxiliary combustion chambers 5 through the auxiliary air supply ports 25 at or near the upper deadpoint of FIG. 2. At this time, the exhaust gas is expelled from the auxiliary combustion chambers 5 through the auxiliary exhaust ports 26 and the main exhaust ports 9 to drive the exhaust turbine 46.

PISTON MOVEMENT TOWARD LOWER DEADPOINT

The explosive combustion occurring within the main combustion chamber 4 causes the respective main pistons 2 to move toward the lower deadpoint of FIGS. 1 and 3.

When the respective main pistons 2 start moving toward the lower deadpoint, the main air suction ports 34 are closed because of rotational displacement of the engine body 1, so that the air previously introduced into the respective main air supply chambers 27a is compressed. Further, the auxiliary air supply ports 25 and auxiliary exhaust ports 26 of the respective main pistons 2 are closed, so that the air previously introduced into the respective auxiliary combustion chambers 5 is also compressed.

When the respective main pistons 2 approach the lower deadpoint (see FIG. 1), the main exhaust ports 9 and main air supply passages 13 of the engine body 1 are opened relative to the main combustion chamber 4 almost simultaneously or with a slight time lag. As a result, the air having been previously compressed to a very high extent within the respective main air supply chambers 27a is forcibly introduced under high pressure into the main combustion chamber 4 through the main air supply passages 13 to expel the exhaust gas from the main combustion chamber 4 through the main exhaust ports 9, thereby driving the exhaust turbine 46. Further, the end valve openings 35a (FIG. 11) of the auxiliary air suction ports 35 overlap the guide slots 6 of the engine body 1 due to rotational displacement thereof to introduce a new supply of air into the respective auxiliary air supply chambers 27b (see FIG. 3).

LOWER DEADPOINT

At or near the lower deadpoint of FIGS. 1 and 3, the air previously compressed in the respective auxiliary combustion chambers 5 is mixed with an amount of fuel supplied by the first and third fuel injectors F1, F3 (see FIG. 14), respectively, and the air-fuel mixture is spontaneously ignited at a high temperature which results from high degree of compression in the respective auxiliary combustion chambers 5.

PISTON MOVEMENT TOWARD UPPER DEADPOINT

The explosive combustion occurring within the respective auxiliary combustion chambers 5 causes the respective main pistons 2 to move toward the upper deadpoint of FIG. 2.

When the respective main pistons 2 start moving toward the upper deadpoint, the auxiliary air suction ports 35 are closed because of rotational displacement of the engine body 1, so that the air previously introduced into the respective auxiliary air supply chambers 27b is compressed. Further, the main exhaust ports 9 and the main air supply passages 13 are closed, so that the air previously introduced into the main combustion chamber 4 is also compressed.

When the respective main pistons 2 approach the upper deadpoint, the auxiliary air supply ports 25 and auxiliary exhaust ports 26 of the main pistons 2 are opened almost simultaneously or with a slight time lag. As a result, the air having been previously compressed to a very high extent within the respective auxiliary air supply chambers 27b is forcibly introduced under high pressure into the respective auxiliary combustion chambers 5 through the auxiliary air supply ports 25 to expel the exhaust gas from the auxiliary combustion chambers 5 through the auxiliary exhaust ports 26 and the main exhaust ports 9, thereby driving the exhaust turbine 46. Further, the end valve openings 34a (see FIG. 11) of the main air suction ports 34 overlap the guide slots 6 of the engine body 1 due to rotational displacement thereof to introduce a new supply of air into the respective main air supply chambers 27a.

The engine according to the illustrated embodiment operates constantly by repeating the above cycle wherein explosive combustion takes place at both of the upper and lower deadpoints. Therefore, the engine of the present invention is an unprecedented one-cycle engine in which all of the four pistons 2, 43 are arranged in opposition within the single engine body 1 (single cylinder).

The exhaust turbine 46 is driven by the exhaust gas discharged at both of the upper and lower deadpoints of the piston reciprocation, and the rotation of the exhaust turbine 46 is transmitted retrospectively to the engine body 1 through the transmission gear mechanism 51 (FIG. 20). Thus, the heat energy of the exhaust gas is effectively recovered to greatly increase the heat efficiency of the engine. Further, the exhaust turbine 46 functions also as a flywheel for the engine body 1, and the exhaust turbine can be rendered extremely light if the reduction ratio of the transmission gear mechanism 51 is set large. Moreover, the exhaust turbine 46 additionally works as a blower for sending the cooling air throughout the engine, as described below.

While the engine operates, the exhaust turbine 46 continues to rotate by the exhaust gas discharged at both deadpoints of the piston reciprocation. As a result, the exhaust turbine 46 causes external air to be sucked into the annular cooling chamber 63 (FIG. 3) through the cooling air intake ports 61 of the gear casing 52 and the cooling air inlet openings 50 of the turbine 46 (FIG. 18). Thus, the cooling air externally cools the engine body 1 around the main combustion chamber 4, and internally cools the turbine 46 itself. Obviously, the cooling efficiency is enhanced by the cooling fins 14 of the engine body 1. Further, the cooling air provides a pressure buildup within the cooling chamber 63, consequently establishing a pressure balance within the engine for preventing lubricant leakage which would otherwise occur due to pressure differences within the engine body.

The above-described engine has the following advantages in addition to those already described in connection with the exhaust turbine 46.

(1) Since the engine body 1 itself rotates with the main pistons 2, the engine of the present invention requires no crank mechanism which may result in a considerable energy loss.

(2) Since the main pistons 2 reciprocate in the opposite directions to counteract each other, the engine vibration can be minimized.

(3) Since the main pistons 2 and the auxiliary pistons 43 are arranged coaxially within the single engine body (single cylinder) with the auxiliary pistons inserted in the main pistons, the space utilization within the engine body 1 can be maximized. In other words, the engine of the present invention can be rendered compact in spite of the fact that it incorporates four pistons to provide three combustion chambers in a single cylinder.

(4) Since the engine of the present invention is a one-cycle engine wherein explosive combustion takes place at both deadpoints of piston reciprocation, the engine output per unit cylinder volume can be greatly increased as compared to a conventional engine wherein explosive combustion occurs only at the upper deadpoint of piston reciprocation.

(5) Since the air within the respective combustion chambers 4, 5 are elastically compressed at both deadpoints of piston reciprocation, the elastic restoration force of the compressed air can be effectively utilized for assisting piston reciprocation. Thus, the kinetic energy loss of piston reciprocation can be minimized.

(6) Due to the provision of the diametrically smaller portion 17a of each main piston 2, an annular space is formed between the diametrically smaller portion 17a and the corresponding diametrically larger end bore portion 1b of the engine body 1 at the lower deadpoint (see FIG. 1) of the engine reciprocation to increase the volume of the corresponding auxiliary air supply chamber 27b. As a result, it is possible to realize higher air compression in the auxiliary air supply chamber 27b (as required for effective scavenging of the corresponding auxiliary combustion chamber 5) in comparison with an arrangement wherein the auxiliary air supply chamber 27b is provided only the corresponding guide slot 6 of the engine body.

(7) The fuel injectors F1-F3, which are simple in arrangement, are provided conveniently by utilizing the respective joints J1-J3 without using a separate valve. Further, since the opening and closing of the fuel injector is realized by axial between each two adjacent portions 15a-15d of the central shaft 15 against the spring 75 and/or the pressure in the hydraulic passage 76 (see FIG. 1), it is easy to control the fuel injection by adjusting the spring load and/or the hydraulic pressure.

(8) The rollers 23 (FIG. 6) for the guide projections 19 of each main piston 2 enable smooth piston reciprocation without undue abrasion. Thus, it is possible to realize a high-speed engine operation with a reduced degree of noises.

Obviously, a plurality of engines according to the present invention may be connected in one or plural series. Alternatively, a plurality of engines according to the present invention may be arranged at the respective corners of a polygon, and the main output shafts of the respective engines may be rotationally coupled by gears.

The present invention being thus described, it is obvious that the same may be varied in many ways. Such variations are not to be regarded as a departure from the spirit and scope of the invention, and all such modifications as would be obvious to those skilled in the art are intended to be included within the scope of the following claims.

We claim:

1. An internal combustion engine comprising:
a rotary engine body having a piston housing bore;
an axially opposed pair of hollow main pistons disposed within the bore of the engine body to define a main combustion chamber between the pair of main pistons, the main pistons being rotatable with the engine body but slidably reciprocatable between upper and lower deadpoints relative to the engine body, the main pistons respectively carrying cam follower means extending transversely through the engine body;
hollow cam carrier means rotatably receiving the engine body, the cam carrier means internally having a pair of curved cam grooves receiving the respective cam follower means of the main pistons for causing the main pistons to make one full rotation with the engine body as the main pistons make two reciprocations;
a pair of axially fixed auxiliary pistons arranged on both sides of the main combustion chamber, the auxiliary pistons being inserted into the respective main pistons to define a pair of auxiliary combustion chambers within the respective main pistons;
air supply means for supplying compressed air alternately into the main combustion chamber and into the auxiliary combustion chambers; and exhaust means for allowing exit of exhaust gas alternately from the main combustion chamber and from the auxiliary combustion chambers;

wherein the piston housing bore of the engine body includes a diametrically smaller central bore portion and an axially opposite pair of cylindrical diametrically larger end bore portions; and wherein each of the main pistons has a diametrically smaller portion for slidably fitting in the central bore portion of the engine body, and a cylindrical diametrically larger portion for slidably fitting in a corresponding end bore portion of the engine body.

2. The engine according to claim 1, wherein the diametrically smaller central bore portion of the engine body is provided by an annular ceramic lining.

3. The engine according to claim 1, wherein the air supply means comprises:

main air suction ports formed in the cam carrier means axially outwardly of the respective cam grooves;

auxiliary air suction ports formed in the cam carrier means axially inwardly of the respective cam grooves;

main air supply chambers which are compressed by the respective main pistons brought toward the lower deadpoint but which communicate with the main air suction ports when the main pistons are nearly at the upper deadpoint;

auxiliary air supply chambers which are compressed by the respective main pistons brought toward the upper deadpoint but which communicate with the auxiliary suction ports when the main pistons are nearly at the lower deadpoint;

main air supply passage means for supplying the compressed air from the respective main air supply chambers into the main combustion chamber when the main pistons approach the lower deadpoint; and auxiliary air supply ports formed in the respective main pistons for supplying the compressed air from the respective auxiliary air supply chambers into the respective auxiliary combustion chambers when the main pistons approach the upper deadpoint.

4. The engine according to claim 3, wherein each diametrically larger end bore portion of the engine body is formed with guide slots while the diametrically larger portion of each main piston has guide projections slidably fitting in the respective guide slots, each of the guide slots being divided by a corresponding one of the guide projections into a first slot section located behind the corresponding the guide projection and a second slot section located ahead of the corresponding guide projection, each of the main air supply chambers including the first slot section, each of the auxiliary air supply chambers including the second slot section, said each auxiliary air supply chamber further including an annular space formed between said each diametrically larger end bore portion of the engine body and the diametrically smaller portion of said each main piston.

5. The engine according to claim 1, wherein each diametrically larger end bore portion of the engine body is formed with guide slots while the diametrically larger portion of each main piston has guide projections slidably fitting in the respective guide slots, each of the guide projections being provided laterally with a plurality of rollers for rolling contact with a corresponding one of the guide slots.

6. The engine according to claim 1, wherein the exhaust means comprises two annular series of main exhaust ports formed in the engine body, the respective series of main exhaust ports communicating alternately with the main combustion chamber and with the auxiliary combustion chambers, the main exhaust ports being curved to impart whirling motion to the exhaust gas upon passage through the main exhaust ports for assisting rotation of the engine body.

7. The engine according to claim 6, wherein the exhaust means further comprises auxiliary exhaust ports formed in the respective main pistons for establishing communication between the auxiliary combustion chambers and the main exhaust ports when the main pistons are nearly at the upper deadpoint, the main combustion chamber communicating with the main exhaust ports when the main pistons are nearly at the lower deadpoint.

8. The engine according to claim 6, further comprising:

an exhaust turbine rotated around the engine body by the exhaust gas, the turbine having a plurality of diametrically different annular series of turbine blades in corresponding relation to each annular series of main exhaust ports;

and a transmission gear mechanism for transmitting rotation of the turbine to the engine body to assist rotation thereof.

9. The engine according to claim 8, further comprising an engine starter device coupled to the transmission gear mechanism.

10. The engine according to claim 1, further comprising fuel supply means for supplying a fuel alternately into the main combustion chamber and into the auxiliary combustion chambers.

11. The engine according to claim 1, wherein each of the cam follower means has a piston pin which rotatably carries rollers received in a corresponding one of the cam grooves, each of the cam grooves being partially closed by a pair of projections spaced from each other by a distance which is slightly larger than the diameter of the piston pin.

12. An internal combustion engine comprising:

a rotary engine body having a piston housing bore;

an axially opposed pair of hollow main pistons disposed within the bore of the engine body to define a main combustion chamber between the pair of main pistons, the main pistons being rotatable with the engine body but slidably reciprocatable between upper and lower deadpoints relative to the engine body, the main pistons respectively carrying cam follower means extending transversely through the engine body;

hollow cam carrier means rotatably receiving the engine body, the cam carrier means internally having a pair of curved cam grooves receiving the respective cam follower means of the main pistons for causing the main pistons to make one full rotation with the engine body as the main pistons make two reciprocations;

a pair of axially fixed auxiliary pistons arranged on both sides of the main combustion chamber, the auxiliary pistons being inserted into the respective main pistons to define a pair of auxiliary combustion chambers within the respective main pistons;

air supply means for supplying compressed air alternately into the main combustion chamber and into the auxiliary combustion chambers;

fuel supply means for supplying a fuel alternately into the main combustion chamber and into the auxiliary combustion chambers; and exhaust means for allowing exit of exhaust gas alternately from the main combustion chamber and from the auxiliary combustion chambers;

wherein the main and auxiliary pistons are axially penetrated by a fixed central shaft which includes separable shaft portions connected at joints positionally corresponding to the main and auxiliary combustion chambers, the shaft portions being axially urged toward each other by an urging means; and wherein the fuel supply means comprises a fuel injector provided at each of the respective joints, the fuel injector having a fuel reservoir connected to a fuel supply source and a plurality of tapering discharge orifices extending radially from the fuel reservoir, the discharge orifices being normally closed by the urging means but openable against the urging means when the pressure in the fuel reservoir increases to a predetermined level.

13. The engine according to claim 12, wherein each of the joints comprises a splined central projection and a splined central bore for slidably receiving the splined central projection, the fuel reservoir being formed around the splined central projection.

14. The engine according to claim 12, wherein the urging means comprises a spring acting on an end face of the fixed central shaft.

15. The engine according to claim 12, wherein the urging means comprises means for applying a hydraulic pressure on an end face of the fixed central shaft.

16. The engine according to claim 15, wherein the urging means additionally comprises means for applying a hydraulic pressure on said end face of the fixed central shaft.

17. The engine according to claim 12, wherein the fixed central shaft is provided with radial lubrication pores.

* * * * *